(12) United States Patent
Manji

(10) Patent No.: US 11,872,979 B2
(45) Date of Patent: Jan. 16, 2024

(54) WORK VEHICLE

(71) Applicant: Kubota Corporation, Osaka (JP)

(72) Inventor: Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 648 days.

(21) Appl. No.: 16/704,248

(22) Filed: Dec. 5, 2019

(65) Prior Publication Data

US 2020/0282972 A1    Sep. 10, 2020

(30) Foreign Application Priority Data

Mar. 6, 2019   (JP) ................................ 2019-040293

(51) Int. Cl.
| | |
|---|---|
| *B60W 20/13* | (2016.01) |
| *B60L 50/60* | (2019.01) |
| *B60K 15/03* | (2006.01) |
| *B60W 50/02* | (2012.01) |

(52) U.S. Cl.
CPC ............. *B60W 20/13* (2016.01); *B60K 15/03* (2013.01); *B60L 50/60* (2019.02); *B60W 50/02* (2013.01); *B60K 2015/03217* (2013.01); *B60W 2300/156* (2013.01)

(58) Field of Classification Search
CPC ................. B60W 20/13; B60W 50/02; B60W 2300/156; B60L 50/60; B60K 15/03; B60K 2015/03217
See application file for complete search history.

(56) References Cited

U.S. PATENT DOCUMENTS

| | | | |
|---|---|---|---|
| 10,322,714 B2* | 6/2019 | Endo ..................... | B60W 10/06 |
| 2006/0108956 A1 | 5/2006 | Clark et al. | |
| 2008/0121443 A1 | 5/2008 | Clark et al. | |
| 2009/0069964 A1* | 3/2009 | Wyatt ................... | B60W 10/30 |
| | | | 701/22 |
| 2009/0259356 A1 | 10/2009 | Clark et al. | |
| 2011/0106357 A1 | 5/2011 | Clark et al. | |
| 2012/0004839 A1 | 1/2012 | Mizuno et al. | |
| 2012/0116628 A1 | 5/2012 | Clark et al. | |
| 2014/0062352 A1* | 3/2014 | Wang ....................... | H02P 3/02 |
| | | | 318/139 |

(Continued)

FOREIGN PATENT DOCUMENTS

| | | |
|---|---|---|
| DE | 102013013623 A1 | 3/2014 |
| EP | 2982560 A1 | 2/2016 |

(Continued)

*Primary Examiner* — Jeff A Burke
*Assistant Examiner* — Mohamad O El Sayah
(74) *Attorney, Agent, or Firm* — The Webb Law Firm

(57) ABSTRACT

A work vehicle includes a driving wheel provided in a machine body, a motor for inputting a rotational force to the driving wheel, a traveling control device for acquiring an output instruction for the motor according to an operation of a maneuvering lever, a traveling control unit for controlling driving of the motor in accordance with the output instruction, a battery for reserving energy source for driving the motor, a remaining amount detection section for detecting a remaining amount of the energy source in the battery, and a restriction section for restricting a maximum speed of the machine body to a preset speed irrespectively of the output instruction if the remaining amount of the energy source is equal to or smaller than a preset first threshold value.

5 Claims, 3 Drawing Sheets

(56) References Cited

U.S. PATENT DOCUMENTS

2018/0152121 A1* 5/2018 Fukano ................ B60L 58/12

FOREIGN PATENT DOCUMENTS

| EP | 3326444 A1 | 5/2018 |
| JP | 2006166693 A | 6/2006 |
| JP | 2011189768 A | 9/2011 |
| JP | 201213021 A | 1/2012 |
| JP | 2012147592 A | 8/2012 |
| JP | 2012217225 A | 11/2012 |
| JP | 2012222896 A | 11/2012 |
| JP | 201445637 A | 3/2014 |
| WO | 2013015181 A1 | 1/2013 |

* cited by examiner

WORK VEHICLE

CROSS-REFERENCE TO RELATED APPLICATION

This application claims priority to Japanese Patent Application No. 2019-040293 filed Mar. 6, 2019, the disclosure of which is hereby incorporated by reference in its entirety.

TECHNICAL FIELD

The present invention relates to a work vehicle which travels in a field while carrying out a utility work.

BACKGROUND ART

Conventionally, a work vehicle has been used when a utility work is carried out in a field. Such work vehicle is configured to travel while carrying out a utility work with using an output of at least one of an engine and a motor (to be referred to as a "power source" hereinafter). In case such power source is an engine, fuel is supplied from a fuel tank to the power source. Whereas, in case the power source is a motor, in many cases, the power source is configured to be supplied with electric power from a battery (fuel and electric power will be referred to as "energy source" hereinafter). If such energy source is exhausted during traveling or a utility work of the work vehicle, this will present a trouble in the work in the field. For this reason, the art has contemplated a technique of monitoring a remaining amount in a reservoir section (a fuel tank or a battery) which stores such energy source and reporting or alarming when the remaining amount becomes below a predetermined value (e.g. Patent Document 1).

Patent Document 1 discloses a driving assistance device that utilizes at least one of an internal combustion engine and an electric power generator as a power source for traveling and that is mounted on a traveling vehicle. This driving assistance device obtains information relating to at least one of a road condition of a predetermined area which is present in the traveling destination of the vehicle, a current vehicle situation, and a past operational situation. And, this driving assistance device, based on such information, will make a prediction whether deterioration of fuel consumption efficiency of the vehicle will occur or not in the traveling course of the vehicle. If it is predicted that deterioration of fuel consumption efficiency of the vehicle will be invited, this driving assistance device will report (inform) in advance a riding person of the vehicle an operation for improving fuel consumption efficiency of the vehicle.

PRIOR ART DOCUMENT

Patent Document 1: JP2012-13021A

DISCLOSURE OF THE INVENTION

Problem to be Solved by Invention

The technique disclosed in Patent Document 1 above is configured such that in case it is predicted that fuel consumption efficiency deterioration will be invited, an operation for improving fuel consumption efficiency of the vehicle is reported in advance to the riding person of the vehicle. However, for a user using the traveling work vehicle while being engaged in a utility work in a field, even if such situation is reported, as the user concentrates himself/herself in the work or traveling operation, this user may fail to take notice of the reporting. In such case, it may be anticipated that the work vehicle may make an unexpected stop due to exhaust of the energy source at a site distant from a site where energy replenishment is possible (this site will be referred to as "replenishment site" hereinafter). If this happens, the user will need to transport energy source from the replenishment site to the site of the stopped vehicle or to carry the reservoir to the replenishment site, fill it with the energy source, and then carry the replenished reservoir to the site of the stopped vehicle. These causes relatively much trouble.

In view of the above, there is a need for a work vehicle allowing a user to grasp diminishing of the energy source.

Means for Solving Problem

According to a characterizing feature of a work vehicle relating to the present invention, there is provided a work vehicle that travels in a field while carrying out a utility work, the work vehicle comprising:
  a driving wheel provided in a machine body;
  a power source for inputting a rotational force to the driving wheel;
  an output instruction acquisition section for acquiring an output instruction for the power source according to an operation of an operation input unit;
  a traveling control unit for controlling driving of the power source in accordance with the output instruction;
  a reservoir section for reserving energy source for driving the power source;
  a remaining amount detection section for detecting a remaining amount of the energy source in the reservoir section; and
  a restriction section for restricting a maximum speed of the machine body to a preset speed irrespectively of the output instruction if the remaining amount of the energy source is equal to or smaller than a preset first threshold value.

With the above-described characterizing arrangement, in correspondence with reduction in the remaining amount of the energy source, it is possible to dare to forcibly reduce a vehicle speed at which the work vehicle can travel. As a result, by providing the user with "inconvenience", the user can be made to become aware of the diminishing of the remaining amount of the energy source. Therefore, it becomes possible to avoid the situation of energy shortage occurring in the middle of the field for instance, and to urge the user to replenish the energy source spontaneously.

Further, preferably, the restriction section is configured to make restriction such that when the remaining amount of the energy source is equal to or smaller than the first threshold value, the maximum speed is progressively decreased in accordance with diminishing of the remaining amount of the energy source.

With the above-described arrangement, the restriction of the maximum speed can be carried out easily in accordance with the remaining amount of the energy source.

Further, preferably, the restriction section restricts the maximum speed to a preset fixed value if the remaining amount of the energy source is equal to or smaller than a second threshold value which is smaller than the first threshold value.

With the above-described arrangement, it becomes possible to secure a speed needed when moving to the energy sourced replenishment site due to diminishing of the remaining amount of the energy source. Therefore, it is possible to avoid prolongation of a time needed for movement to the energy source replenishment site.

Further, preferably, the work vehicle further comprises:
a work unit driven with using the energy source for carrying out the utility work; and
a stopping section for stopping driving of the work unit if the remaining amount of the energy source is equal to or smaller than a preset third threshold value.

With the above-described arrangement, in association with reduction in the energy source, the work unit that consumes a large electric power can be stopped for instance. As a result, by giving a feeling of "wrongness" to the user by intentionally interfering with progress of the utility work, it is possible to secure energy source needed at least for traveling of the work vehicle to the energy source replenishment site.

Still further, preferably, the power source comprises a motor and the reservoir section comprises a battery.

With the above-described arrangement, if the state of the battery (e.g. charged state of the battery, an output voltage state of the battery, etc.) becomes equal to or smaller than the first threshold value, the speed of the machine body by the operation input unit can be reduced in accordance with this battery state. As a result, it is possible to prompt the user to effect charging by providing the user with feeling of wrongness.

Further, preferably, the restriction section restricts an electric current running in the motor according to stored power amount of the battery.

With the above-described arrangement, the restriction section effects the restriction of the maximum speed easily.

BEST MODE OF CARRYING OUT THE INVENTION

A work vehicle relating to the present invention is configured to allow a user to grasp diminishing of an energy source used for driving the work vehicle. Next, a work vehicle 1 according to the instant embodiment will be explained.

Figure 1:
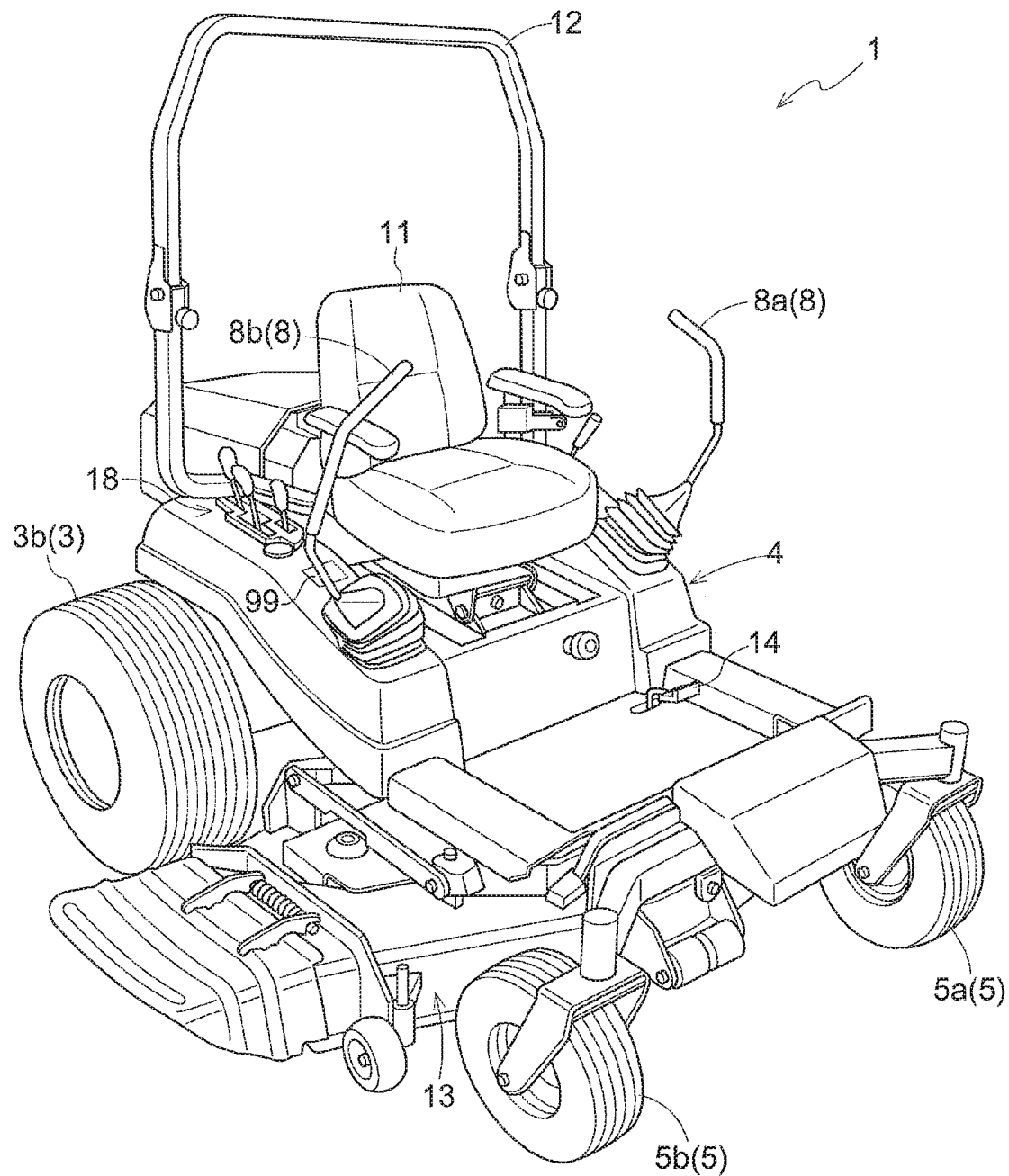
FIG. 1 is a perspective view of a work vehicle according to an instant embodiment.
Figure 2:
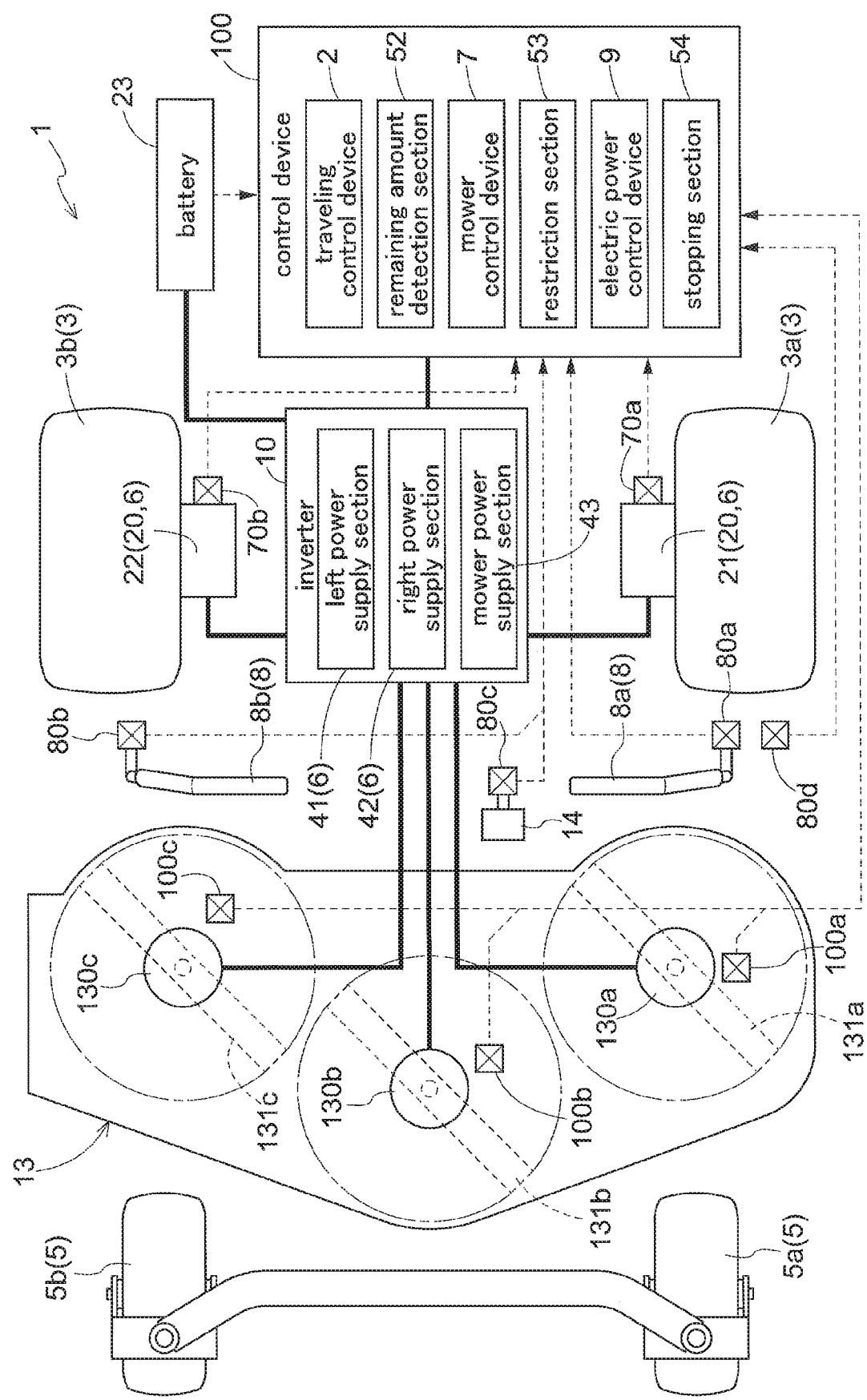
FIG. 2 is a system diagram showing an electric system and a power system of the work vehicle.

FIG. 1 shows a perspective view of a riding electric grass cutting machine as one example of the work vehicle 1 of this embodiment. Also, FIG. 2 shows a system diagram showing an electric system and a power system of the work vehicle 1. The work vehicle 1 according to the instant embodiment is configured to restrict a maximum speed of the work vehicle 1 when a predetermined condition (to be detailed later) is satisfied.

In the instant embodiment, as an example of the work vehicle 1, a riding electric grass cutting machine will be cited and explained. In this case, a grass cutting work corresponds to a work ("a utility work") relating to the invention. The work vehicle 1 travels in a field while carrying out a grass cutting work.

An electric power control device 9 controls electric power used by the work vehicle 1 which travels while carrying out a utility work. The electric power used by the work vehicle 1 includes electric power used for traveling of the work vehicle 1, electric power used for the utility work carried out by the work vehicle 1, and electric power for a user who uses the work vehicle 1. A specific example of the electric power used for traveling of the work vehicle 1 is electric power supplied to motors 20 (an example of "power source") which input rotational forces to driving wheels 3 included in a machine body 4 of the work vehicle 1. A specific example of the electric power used for a utility work carried out by the work vehicle 1 is electric power to be supplied to motors ("mower motors 130a, 130b, 130c" to be described later) which rotate cutter blades used for a grass cutting work. A specific example of the electric power used for a user who uses the work vehicle 1 is electric power used for displaying by an instrument panel 99. The electric power control device 9 is mounted on the work vehicle 1 that carries out such work. The electric power control device 9 appropriately distributes the respective electric powers to functional sections for carrying out the respective functions.

As shown in FIG. 1 and FIG. 2, the riding electric grass cutting machine includes the machine body 4, a battery (an example of a "reservoir section") 23, a driver's seat 11, a ROPS frame 12 and a mower unit (an example of a "work unit") 13. The machine body 4 is supported by caster wheels 5 constituting front wheels and the driving wheels 3 constituting rear wheels. The battery 23 is disposed at a rear portion of the machine body 4. The driver's seat 11 is disposed forwardly of the battery 23. The ROPS frame 12 is mounted erect from the rear side of the driver's seat 11. The mower unit 13 is suspended from the machine body 4 to be lifted up/down via a lift (elevating/lowering) mechanism in a space beneath the machine body 4 and between the caster wheels 5 and the driving wheels 3.

The driving wheels 3 are driven by a traveling control unit 6. Operations of this traveling control unit 6 are controlled by a traveling control device 2 (an example of an "output instruction acquisition section"). Operations of the mower unit 13 are controlled by a mower control device 7. Here, it is noted that the caster wheels 5 consist of a left caster wheel 5a and a right caster wheel 5b and the driving wheels 3 consist of a left driving wheel 3a and a right driving wheel 3b.

Forwardly of the driver's seat 11, there is provided a floor plate acting as a "footrest" for the driver. From this floor plate, a brake pedal 14 protrudes. On the left and right opposed sides of the driver's seat 11, there are disposed a left maneuvering lever 8a and a right maneuvering lever 8b. Further, on the side of the driver's seat 11, there is provided an electric operational panel 18. This electric operational panel 18 includes switch buttons, switch levers or the like of the electric control system. On this electric operational panel 18, a mower switch for activating the mower unit 13 and the instrument panel 99 described above are disposed. Incidentally, in the following explanation, the above-described left maneuvering lever 8a and the right maneuvering lever 8b will be generically referred to as "maneuvering lever 8" (an example of "operation input unit") when no distinction therebetween is particularly needed.

In the instant embodiment, power sources for the left driving wheel 3a and the right driving wheel 3b are rotational forces from a left motor 21 and a right motor 22, respectively. Both the left motor 21 and the right motor 22 are in-wheel motors. Via a left power supply section 41, electric power is supplied to the left motor 21. The left power supply section 41 is included in an inverter 10. Via a right power supply section 42, electric power is supplied to the right motor 22. The right power supply section 42 also is included in the inverter 10. By changing the supplied electric powers respectively, it is possible to change at least one of a rotational speed and a torque. With this, respective rotational speeds (circumferential speeds) of the left driving wheel 3*a* and the right driving wheel 3*b* can be made different from each other. As a result, due to a rotational speed difference between the left driving wheel 3*a* and the right driving wheel 3*b*, the riding electric grass cutting machine makes a turn.

The traveling control unit 6 is a functional section for controlling traveling and turning of the riding electric grass cutting machine. In the instant embodiment, the traveling control unit 6 includes the left motor 21, the right motor 22 and the inverter 10 (in particular, the left power supply section 41 and the right power supply section 42) which were mentioned above. The inverter 10 supplies electric power to the left motor 21 and the right motor 22 respectively. Electric power outputted from the inverter 10 corresponds to a speed instruction value (a target value) calculated by the traveling control device 2. When the actual rotational speed (the actual speed) becomes smaller than a target value due to a traveling load, the electric power outputted from the inverter 10 will be corrected to increase the motor output torque. On the other hand, in the case of e.g. traveling on a downslope, if the actual rotational speed (the actual speed) becomes greater than the target value, the electric power outputted from the inverter 10 will be corrected to decrease the motor output torque.

The mower unit 13 includes three rotary blades 131*a*, 131*b*, 131*c*. These rotary blades 131*a*, 131*b*, 131*c* respectively use the mower motors 130*a*, 130*b*, 130*c* as their driving power sources. Electric power supplies to the mower motors 130*a*, 130*b*, 130*c* are carried out via a mower power supply section 43. This mower power supply section 43 too is included in the inverter 10. The mower power supply section 43 is controlled by the mower control device 7. This mower control device 7 constitutes a control device 100, together with the traveling control device 2 and the electric power control device 9 which were described above.

An operational amount (a pivot angle) of the left maneuvering lever 8*a* is detected by a left maneuvering angle detection sensor 80*a*. An operational amount (a pivot angle) of the right maneuvering lever 8*b* is detected by a right maneuvering angle detection sensor 80*b*. Further, an operational angle of the brake pedal 14 is detected by a brake detection sensor 80*c*. An operation of the mower switch is detected by a mower sensor 80*d*. Further, a rotational speed of the left driving wheel 3*a* is detected by a left rear wheel rotation detection sensor 70*a*. A rotational speed of the right driving wheel 3*b* is detected by a right rear wheel rotation detection sensor 70*b*. Further, rotational speeds of the mower motors 130*a*, 130*b*, 130*c* are detected respectively by rotation sensors 100*a*, 100*b*, 100*c*. And, detection results from the respective sensors are transmitted to the control device 100 to be used by this control device 100 when necessary or appropriate.

In the traveling control device 2, based on operational amounts of the respective maneuvering levers 8, electric powers to be supplied respectively to the left motor 21 and the right motor 22 are calculated. Further, in this traveling control device 2, by a known feedback control technique, the above-describe electric powers are corrected. Namely, the traveling control device 2 calculates required driving torques (to be referred to simply as "necessary torques" hereinafter) required by the left motor 21 and the right motor 22. Here, the necessary torque means a torque amount required by the left motor 21 or the right motor 22 for the actual speed to reach the target speed in case an actual rotational speed has not arrived at a target rotational speed with a control amount calculated by a target rotational speed set in correspondence with an operational amount by the left maneuvering lever 8*a* or the right maneuvering lever 8*b*. The traveling control device 2 derives such necessary torques from the target rotational speeds of the left driving wheel 3*a* and the right driving wheel 3*b* and the actual rotational speeds of the left driving wheel 3*a* and the right driving wheel 3*b*. Such target rotational speeds of the left driving wheel 3*a* and the right driving wheel 3*b* are obtained, based on detection results of the left maneuvering angle detection sensor 80*a* and the right maneuvering angle detection sensor 80*b*. The actual rotational speeds of the left driving wheel 3*a* and the right driving wheel 3*b* are obtained by the left rear wheel rotation detection sensor 70*a* and the right rear wheel rotation detection sensor 70*b* respectively. Then, based on such calculated necessary torques, the traveling control device 2 corrects the electric power amounts.

Next, there will be explained a function for allowing a user to grasp diminishing of energy source for driving the work vehicle 1 (to be referred to as "present inventive function" hereinafter) relating to the instant embodiment. The present inventive function is realized by the respective functional sections of the driving wheels 3, the motor 20, the traveling control device 2, the traveling control unit 6, the battery 23, the remaining amount detection section 52, the restriction section 53 and a stopping section 54. In particular, the traveling control device 2, the remaining amount detection section 52, the restriction section 53, and the stopping section 54 are constituted of hardware and/or software including a CPU as the core component thereof, in order to carry out processes relating to the above-described present inventive function.

The driving wheels 3 are provided in the machine body 4 as described above and consist of the left driving wheel 3*a* and the right driving wheel 3*b*, in the instant embodiment. The motor 20 inputs rotational forces to the driving wheels 3. And, this motor 20 consists of the left motor 21 and the right motor 22 in this embodiment, as described above. The left motor 21 inputs a rotational force to the left driving wheel 3*a*. The right motor 22 inputs a rotational force to the right driving wheel 3*b*.

The traveling control device 2 acquires output instructions for the motor 20 according to an operation of the maneuvering lever 8. The maneuvering lever 8 consists of a left maneuvering lever 8*a* and a right maneuvering lever 8*b*. The output instructions for the motor 20 according to an operation of the maneuvering lever 8 refer to electric power amounts to be supplied to the left motor 21 and the right motor 22 calculated based on operations of the left maneuvering lever 8*a* and the right maneuvering lever 8*b* by the user. Such electric power amounts are calculated by the traveling control device 2 in the instant embodiment.

The traveling control unit 6 controls driving of the motor 20 according to output instructions. In this embodiment, as described above, the traveling control unit 6 includes the left motor 21, the right motor 22, the left power supply section 41 and the right power supply section 42. Here, in particular, the left power supply section 41 and the right power supply section 42 correspond to the traveling control unit 6. The output instructions refer to the electric power amounts calculated by the traveling control device 2. Therefore, the left power supply section 41 and the right power supply section 42 control driving of the left motor 21 and the right motor 22 according to electric power amounts calculated by the traveling control device 2.

The battery 23 stores energy source for driving the motor 20. The motor 20 is driven by electric energy. Therefore, the electric energy in this embodiment corresponds to the "energy source" relating to the present invention. The battery 23 stores such electric energy.

The remaining amount detection section 52 detects a remaining amount of the energy source in the battery 23. The energy source in the battery 23 means electric energy charged and stored in the battery 23. Therefore, the remaining amount detection section 52 detects a remaining amount of electric energy stored in the battery 23. Here, the remaining amount may be a value of the electric energy stored in the battery 23 or may be an output voltage of the battery 23 for instance or it may also be a state of charge (SOC: State of Charge). Incidentally, in case the remaining amount detection section 52 detects an output voltage of the battery 23 or a state of charge, a predetermined filtering process (a lowpass filter process) may be effected to a detected value in order to facilitate the detection.

The restriction section 53 restricts (limits) the maximum speed of the machine body 4 to a preset speed irrespectively of an output instruction, in case the remaining amount of the energy source is equal to or smaller than a preset first threshold value. The remaining amount of the energy source, in the instant embodiment, is the remaining amount of the electric energy stored in the battery 23 detected by the remaining amount detection section 52. Output instructions refer to electric power amounts to be supplied to the left motor 21 and the right motor 22 calculated based on operations on the left maneuvering lever 8a and the right maneuvering lever 8b by the user. Namely, if the electric power amounts to be supplied to the left motor 21 and the right motor 22 calculated based on operations on the left maneuvering lever 8a and the right maneuvering lever 8b by the user are large, output torques of the left motor 21 and the right motor 22 are large. As a result, the speed will increase if the road (ground) surface of the field is horizontal or down-sloped, whereby the speed of the work vehicle 1 will increase also.

However, with the present inventive work vehicle 1, if the remaining amount of the electric energy stored in the battery 23 is equal to or smaller than the preset first threshold value, the restriction section 53 restricts (limits) the maximum speed at the time of traveling of the work vehicle 1 to a preset speed. One preferred example of such restriction of maximum speed is restriction of electric power amounts to be supplied to the left motor 21 and the right motor 22 to electric power amounts according to such preset speed. With this arrangement, irrespectively of user's operations on the left maneuvering lever 8a and the right maneuvering lever 8b, the electric power amounts to be supplied to the left motor 21 and the right motor 22 will be reduced. As a result, the traveling speed of the machine body 4 does not become a speed according to the operations on the left maneuvering lever 8a and the right maneuvering lever 8b. With this, feeling of "wrongness" can be given to the user. Thus, it is possible to cause the user to grasp (take notice of) the remaining amount of electric energy stored in the battery 23 having become equal to or smaller than the preset first threshold value. Incidentally, such first threshold value can be set to about 50% of the maximum electric energy amount that can be stored in the battery 23, for example. Needless to say, it may be set to any other amount.

Figure 3:
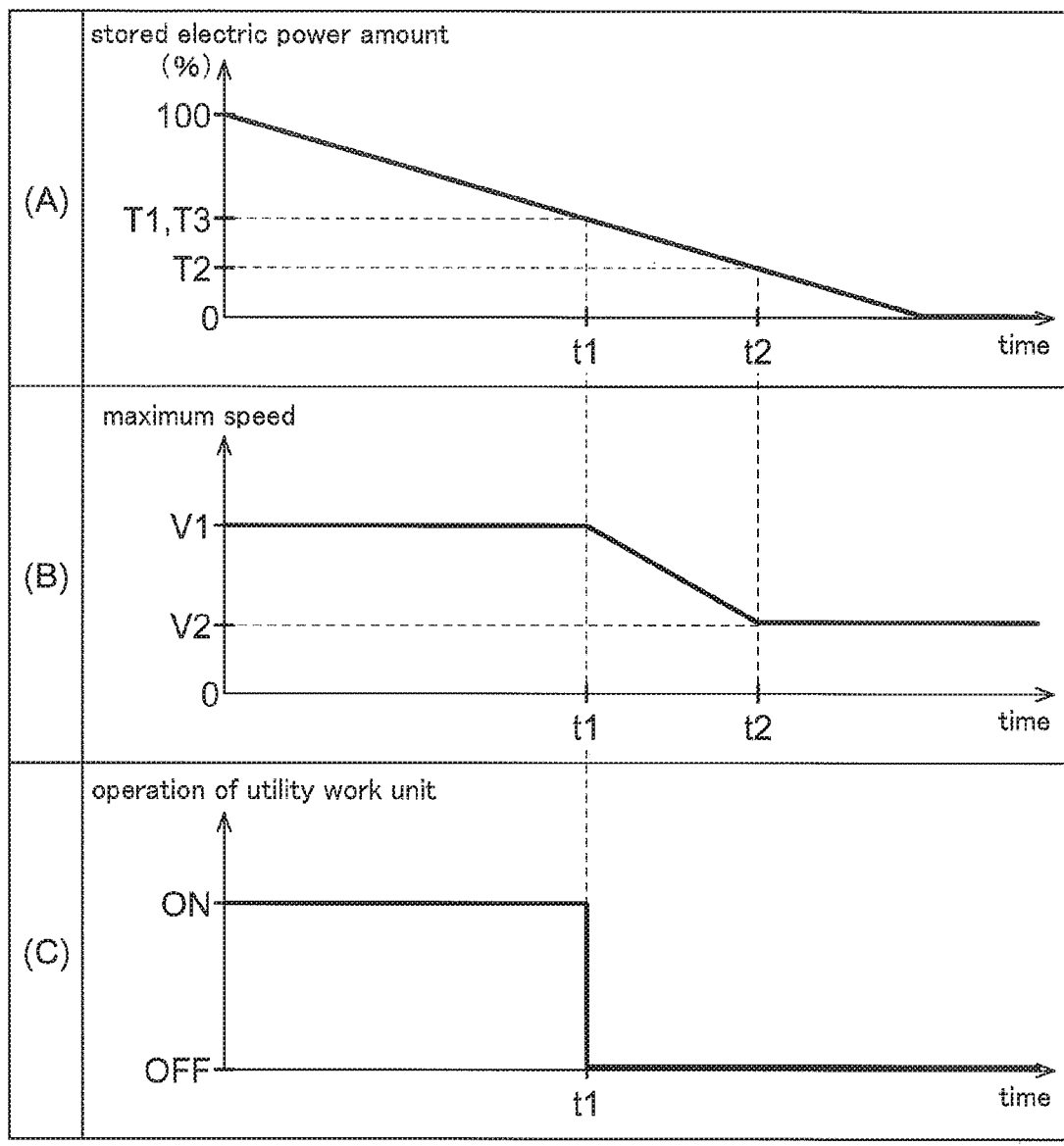
FIG. 3 is a view illustrating restriction of a maximum speed.

FIG. 3 is a view showing one example of maximum speed restriction of the work vehicle 1. In FIG. 3 (A), the horizontal axis is the time axis and the vertical axis represents the stored electric power amount of the battery 23. In particular, in the case of this example of FIG. 3 (A), there is shown a manner of the stored electric power amount progressively decreasing from the 100% state with lapse of time. Further, FIG. 3 (B) shows maximum speeds at which the work vehicle 1 (machine body 4) can travel in the case of transition of the stored electric power amount that occurs as shown in FIG. 3 (A).

The restriction section 53 can effect restriction to progressively decrease the maximum speed in accordance with diminishing of the remaining amount of the energy source in case the remaining amount of the energy source is equal to or smaller than the first threshold value. Here, the remaining amount of the energy source means the stored electric power amount of the battery 23. The first threshold value is not particularly limited. But, here, it is defined as a stored electric power amount corresponding to 50% of the full charge of the battery 23. This threshold value is denoted by a sign T1 in FIG. 3 (A). In case the stored electric power amount is greater than the first threshold value T1, as shown in FIG. 3 (B), the maximum speed at which the work vehicle 1 can travel is a preset value V1.

When the stored electric power amount becomes equal to or smaller than the first threshold value T1 in association with continued traveling of the work vehicle 1 (timing t1), the restriction section 53, as shown in FIG. 3 (B), restricts the maximum speed travelable by the work vehicle 1 so that it may gradually decrease in accordance with the stored electric power amount (after timing: t1).

The restriction section 53 is configured also to restrict the maximum speed to a preset fixed value, in case the remaining amount of the energy source is equal to or smaller than a second threshold value which is smaller than the first threshold value T1. This second threshold value is not particularly limited. But, here, it is defined as a stored electric power amount corresponding to 20% of the full charge of the battery 23. This threshold value is denoted by a sign T2 in FIG. 3 (A). If the stored electric power amount becomes equal or smaller than the second threshold value T2, then, as shown in FIG. 3 (B), the maximum speed travelable by the work vehicle 1 will be restricted to a preset fixed value V2 by the restriction section 53 (after timing: t2).

In such case as above, the restriction section 53 may alternatively be configured to restrict electric current running in the motor 20 according the stored electric power amount of the battery 23. The motor 20 inputs rotational forces to the driving wheels 3. Thus, the electric currents will be restricted. As output torques of the motor 20 are restricted, the maximum speed of the work vehicle 1 can be restricted also.

As described above, as the restriction section 53 restricts the maximum speed of the work vehicle 1 at the time of its traveling irrespectively of user's operation of the maneuvering lever 8, it is possible to give feeling of wrongness to the user, thus making the user grasp diminishing of the remaining amount of the battery 23 in a reliable manner.

Here, as described above, the work vehicle 1 mounts the mower unit 13 for carrying out a grass (lawn) cutting work. This mower unit 13 is driven by using the electric energy stored in the battery 23 (an example of the "energy source").

Preferably, the stopping section 54 is configured to stop driving of the mower unit 13, if the remaining amount of the electric energy is equal to or smaller than a preset third threshold value. Though not particularly limited, in the case of the example shown in FIG. 3, such third threshold value is equal to the first threshold value T1. In FIG. 3 (A), the third threshold value is denoted by a sign T3. If the stored electric power amount becomes equal to or lower than this third threshold value T3, as shown in FIG. 3 (C), the stopping section 54 stops operation of the mower unit 13 (after timing t1).

With the above-described configuration, in association with diminishing of the stored electric power amount of the battery 23, the mower unit 13 is stopped. Thus, it becomes possible to give feeling of wrongness to the user, thereby to make this user grasp diminishing of the remaining amount of the battery 23.

Other Embodiments

In the foregoing embodiment, the explanation was made with citing an electric grass cutting machine as an example of the work vehicle 1. However, the work vehicle 1 may be a tractor for carrying out a plowing work in a field for example, or may be a rice planting machine also. Still further, it may be a combine for carrying out a culm harvesting work in a field or may be a direct seed sowing machine for sowing seeds. Still further, it may be a riding management machine for carrying out e.g. a chemical agent spraying work, etc. Namely, specific examples of the work vehicle 1 include a grass cutting machine, a tractor, a rice planting machine, a combine, a direct seed sowing machine, a riding management machine, etc. Needless to say, the present invention is applicable also to a work vehicle 1 used for carrying out works different from the above in a field. Moreover, the present invention is applicable not only to a riding work vehicle 1, but also to a work vehicle 1 that can be remotely controlled.

In the foregoing embodiment, it was explained that the restriction section 53 restricts the maximum speed such that the maximum speed is progressively decreased in accordance with diminishing of the remaining amount of the energy source in case the remaining amount of the energy source is equal to or less than the first threshold value T1. However, the restriction section 53 may alternatively be configured such that the maximum speed is restricted to a preset fixed value in case the remaining amount of the energy source is equal to or less than the first threshold value T1.

In the foregoing embodiment, it was explained that the restriction section 53 restricts the maximum speed to a preset fixed value in case the remaining amount of the energy source is equal to or smaller than the second threshold value T2 which is smaller than the first threshold value T1. However, the restriction section 53 may be configured to restrict the maximum speed in such a manner that the maximum speed becomes progressively smaller even in case the remaining amount of the energy source is equal to or smaller than the second threshold value T2 which is smaller than the first threshold value T1.

In the foregoing embodiment, it was explained that the stopping section 54 stops the driving of the mower unit 13 in case the remaining amount of the energy source is equal to or smaller than the preset third threshold value T3. However, the stopping section 54 may be configured not to stop driving of the mower unit 13 even in case the remaining amount of the energy source is equal to or smaller than the preset third threshold value T3. Further, the third threshold value T3 may be a different (may be greater or smaller) value from the first threshold value T1.

In the foregoing embodiment, it was explained that the power source is the motor 20 and the reservoir section is the battery 23. However, the power source may be an engine, not a motor. In such case, a fuel tank will correspond to the "reservoir section" relating to the present invention. In this case, preferably, the remaining amount detection section 52 will be configured to detect a remaining amount of fuel. Further, preferably, the restriction section 53 may be configured to restrict the output of the engine.

In the foregoing embodiment, it was explained that the restriction section 53, when restricting the maximum speed, restricts electric current running in the motor 20 in accordance with a stored electric power amount of the battery 23. However, the restriction section 53 may alternatively be configured to restrict the maximum speed by some other method.

In the foregoing embodiment, it was explained that the restriction section 53 restricts the maximum speed of the work vehicle 1 in accordance with a remaining amount of the energy source and the stopping section 54 stops driving of the mower unit 13 in accordance with the remaining amount of the energy source. However, it may alternatively be possible to arrange such that reporting indicative of restriction of the maximum speed being carried out is made during restriction by the restriction section 53. Further, it may be arranged that reporting indicative of stopping being carried out by the stopping section 54 is made during stopping of the driving of the mower unit 13.

In the foregoing embodiment, it was explained that the restriction section 53 restricts the maximum speed travelable by the work vehicle 1 as illustrated in FIG. 3. However, it may alternatively be arranged such that a change amount of the maximum speed is calculated by a following calculation formula in case e.g. the remaining amount detection section 52 detects SOC and the restriction section 53 restricts the maximum speed based on the calculated change amount of the maximum speed.

vehicle speed upper limit change amount=$V1-(V1-V2)/(T1-T2)\times(T1-\text{current SOC})$.

where, V1, V2, T1 and T2 have values shown in FIG. 3.

Further, the restriction section 53 may alternatively be configured such that in place of the above-described calculation formula, it stores in advance a map which defines relationship between remaining amounts of energy source and the maximum speeds and it restricts the maximum speed based on this map.

INDUSTRIAL APPLICABILITY

The present invention is applicable to a work vehicle which travels in a field while carrying out a utility work.

DESCRIPTION OF REFERENCE SIGNS

1: work vehicle
2: traveling control device (output instruction acquisition section)
3: driving wheel
4: machine body
6: traveling control unit
8: maneuvering lever (operation input unit)
13: mower unit (utility work unit)
20: motor (power source)
23: battery (reservoir section)
52: remaining amount detection section
53: restriction section
54: stopping section
T1: first threshold value
T2: second threshold value
T3: third threshold value

The invention claimed is:

1. A riding type work vehicle that travels in a field while carrying out a utility work, the work vehicle comprising:
   a driving wheel provided in a machine body;
   a power source for inputting a rotational force to the driving wheel;
   an output instruction acquisition section for acquiring an output instruction for the power source according to an operation of an operation input unit;
   a traveling control unit for controlling driving of the power source in accordance with the output instruction;
   a reservoir section for reserving energy source for driving the power source;
   a remaining amount detection section for detecting a remaining amount of the energy source in the reservoir section; and
   a restriction section configured to:
      permit a maximum speed of the machine body in accordance with the output instruction when the remaining amount of the energy source is larger than a preset first threshold value;
      progressively decrease the maximum speed of the machine body in accordance with a diminishing of the remaining amount of the energy source, irrespective of the output instruction and a load on the power source, when the remaining amount of the energy source is equal to or smaller than the preset first threshold value and larger than a preset second threshold value, which is smaller than the preset first threshold value; and
      restrict the maximum speed of the machine body to a preset fixed speed, which is larger than zero, irrespective of the output instruction and continued diminishing of the remaining amount of the energy source, when the remaining amount of the energy source is equal to or smaller than the preset second threshold value.

2. The work vehicle of claim 1, further comprising:
   a work unit driven with using the energy source for carrying out the utility work; and
   a stopping section for stopping driving of the work unit if the remaining amount of the energy source is equal to or smaller than a preset third threshold value.

3. The work vehicle of claim 2, wherein the preset first threshold value is equal to the preset third threshold value.

4. The work vehicle of claim 1, wherein the power source comprises a motor and the reservoir section comprises a battery.

5. The work vehicle of claim 4, wherein the restriction section restricts an electric current running in the motor according to stored power amount of the battery.

* * * * *